United States Patent [19]

Kashiwazaki

[11] Patent Number: 4,633,380
[45] Date of Patent: Dec. 30, 1986

[54] APPLIED VOLTAGE DETECTING DEVICE FOR ELECTRIC POWER CONVERTOR

[75] Inventor: Hiroshi Kashiwazaki, Hitachi, Japan

[73] Assignee: Hitachi, Ltd., Tokyo, Japan

[21] Appl. No.: 737,876

[22] Filed: May 28, 1985

[30] Foreign Application Priority Data

May 28, 1984 [JP] Japan ................... 59-108116

[51] Int. Cl.$^4$ ............................................. H02H 7/125
[52] U.S. Cl. ....................... 363/54; 307/252 R
[58] Field of Search ............... 363/2, 54, 68; 340/645, 340/660; 307/252 R, 360, 236; 361/91, 100

[56] References Cited

U.S. PATENT DOCUMENTS

| | | | |
|---|---|---|---|
| 4,100,434 | 7/1978 | Iyotani et al. | 363/68 X |
| 4,313,156 | 1/1982 | Kobayashi et al. | 363/54 |
| 4,320,445 | 3/1982 | Kobayashi et al. | 363/54 |
| 4,536,816 | 8/1985 | Matsumara et al. | 363/54 X |

OTHER PUBLICATIONS

"Performance of High Voltage Light-Triggered Thyristor Valve", IEEE, vol. PAS-102, No. 7, Aug. 1983.

Primary Examiner—Patrick R. Salce
Assistant Examiner—Marc S. Hoff
Attorney, Agent, or Firm—Antonelli, Terry & Wands

[57] ABSTRACT

An applied voltage detecting device for an electric power convertor is disclosed which detects a forward voltage and a backward voltage applied to a power convertor consisting of a semiconductor power control rectification element.

The forward and backward voltages are detected by a detecting circuit while a relative potential difference is being provided to these voltages. The voltages detected by the detecting circuit are converted to optical signals and are picked up by a single optical transmission circuit. The optical signal is again converted to the electric signal by a discrimination circuit, which discriminates whether the signal is the forward detection voltage or the backward detection voltage from the potential difference between them.

The present invention can simplify the detecting device because both forward and backward voltages can be detected by the single optical transmission circuit.

8 Claims, 2 Drawing Figures

"APPLIED VOLTAGE DETECTING DEVICE FOR ELECTRIC POWER CONVERTOR"

BACKGROUND OF THE INVENTION

1. Field of the Invention

This invention relates to a device for detecting an applied voltage to a power convertor, and particularly to a device for detecting an applied voltage to a high voltage thyristor convertor consisting of a plurality of semiconductor power control rectification elements such as thyristors that are connected in series.

2. Description of the Prior Art

Generally, a thyristor convertor used in high voltage circuits is constituted by a plurality of series thyristors in order to reduce the shared voltage per element and to obtain a lower withstand voltage. However, practical characteristics of thyristors are not uniform; turn-on time and turn-off time may vary from thyristor to thyristor. Therefore, when commutation is made from turn-on to turn-off, an overvoltage is applied to a thyristor or thyristors having a short turn-off time, and such thyristors may be damaged. When commutation is made from turn-off to turn-on, an over-voltage is also applied to a thyristor or thyristors having bad turn-off characteristics, and such thyristors also may be damaged.

To prevent damage to thyristors due to the variation of the element characteristics, an applied voltage detecting device has been employed which detects a forward voltage and a backward voltage applied to each series thyristor and adjusts the turn-on timing of turn-on control.

An example of the applied voltage detecting devices of this kind is described, for example, in FIG. 5 of the article entieled PERFORMANCE OF HIGH VOLTAGE LIGHT-TRIGGERED THYRISTOR VALVE", IEEE Transactions on Power Apparatus and Systems, Vol. PAS-102, No. 8, August, 1983.

In the prior art reference described above, an optical thyristor LED and an optical guide LG are disposed for each of the forward and backward voltages in order to detect two kinds of voltages applied to the thyristor.

If a plurality of applied voltage detecting devices are disposed for each of the thyristors, the number of components is great and the device is unavoidably large and complex.

SUMMARY OF THE INVENTION

The present invention is directed to simplify the construction of an applied voltage detecting device for a thyristor convertor.

To accomplish the object described above, the present invention uses in common a single optical transmission circuit for a forward detection voltage and a backward detection voltage by providing these detection voltages with a relatively different potential difference, and after optical signals are again converted to electric signals, discriminates the forward detection voltage from the backward detection voltage on the basis of the potential difference thereby to simplify the construction of the applied voltage detecting device.

DESCRIPTION OF THE PREFERRED EMBODIMENTS

Figure 1:
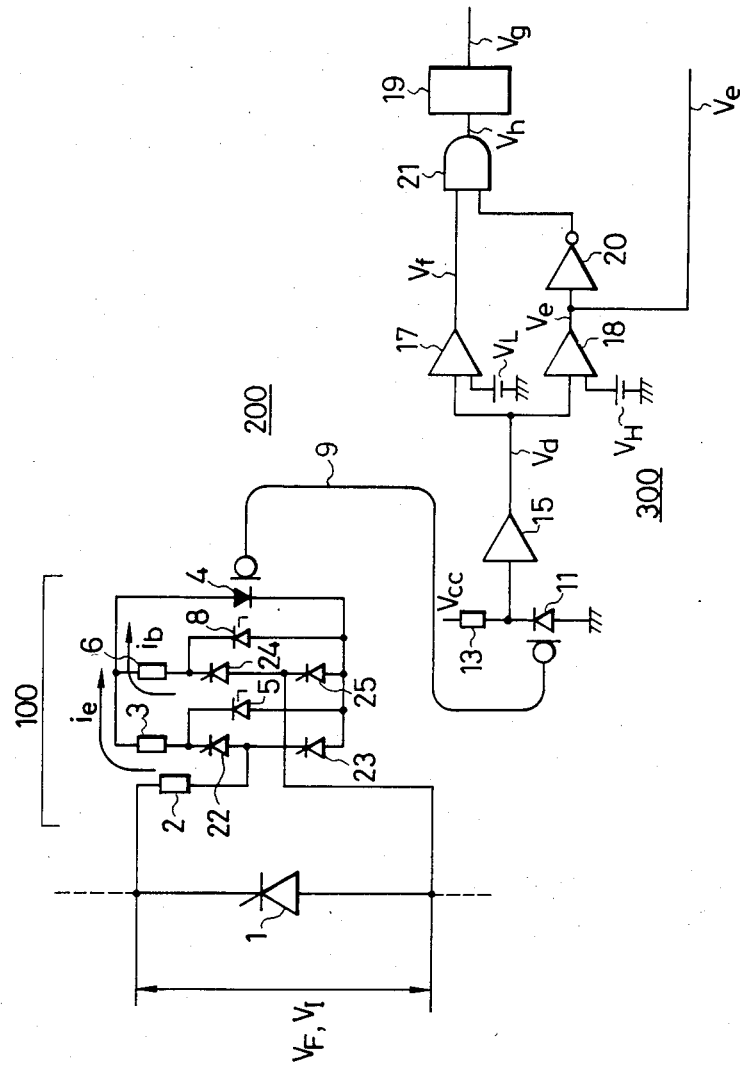
FIG. 1 is a circuit diagram of an applied voltage detecting device in accordance with the present invention.

Referring initially to FIG. 1, an applied voltage detecting device of the invention broadly consists of a detecting circuit 100 for directly detecting an applied voltage of thyristors, an optical transmission circuit 200 for converting the detection signals into optical signals and transmitting the optical signals, and an output processing circuit 300 for processing the transmitted optical signals and producing a forward voltage detection signal and a backward voltage detection signal.

The detecting circuit 100 consists of a full-wave rectification bridge circuit which uses a terminal voltage between the anode and cathode of a thyristor 1 as an a.c. input and a light emitting diode 4 as a load. When a forward voltage $V_F$ is applied to the thyristor 1, a current $i_b$ flows through a current path (shown in FIG. 1) that consists of a diode 24, a resistor 6 (with a constant voltage diode 8 juxtaposed therewith), the light emitting diode 4, a diode 23 and a resistor 2. When a backward voltage $V_I$ is applied to the thyristor 1, on the other hand, a current $i_e$ flows through a current path (a second current path) consisting of the resistor 2, the diode 22, a resistor 3 (with a constant voltage diode 5 juxtaposed therewith), the light emitting diode 4 and a diode 25. The current $i_b$ or $i_e$ always flows through the light emitting diode 4 whether the voltage applied to the thyristor 1 is a forward voltage or a backward voltage, and hence the application of either voltage can be detected.

In this embodiment, therefore, the values of the series resistors 3 and 6 interposed in each current path are made different so as to correspond to each of the forward and backward voltages. For example, the value of the resistor 6 may be made relatively smaller than that of the resistor 3. (Hereinafter, these resistors 6 and 3 will be referred to as the "low resistor 6 and high resistor 3", respectively.) In this case, a high voltage is applied to the light emitting diode 4 in the case of the forward voltage, and a low voltage, in the case of the backward voltage. In this manner, detection signals having mutually different potentials can be applied for the same light emitting source, so that the optical transmission line 200, which will be described later, need not be double as in the prior art, and light transmission can be made by a single optical transmission line.

A light guide 9 such as an optical fiber is used as the optical transmission line 200, and its transmission end is disposed in such a manner as to face the light receiving surface of a photo diode 11 of the output processing circuit 300 whose detail will be described elsewhere.

The output processing circuit 300 is equipped with the photo diode 11 for converting the received optical signals into electric signals, and the converted elelctric signals are amplified by an amplifier 15. The amplified signal $V_a$ contains both of a low level backward voltage detection signal $V_I'$ and a high level forward voltage detection signal $V_F'$ of the same polarity. The reason that they have the same polarity is that both of the currents $i_b$ and $i_e$ flowing through the light emitting diode 4 have flow in the same direction. The signal $V_d$ in which the low level backward voltage detection signal $V_I'$ and the high level forward voltage detection signal $V_F'$ are mixed can not be used as such as a final detection signal. These signals must be separated by some means. In this embodiment, two comparison circuits 17 and 18 operating at reference voltages corresponding to these voltage levels constitute a discrimination circuit.

Figure 2:
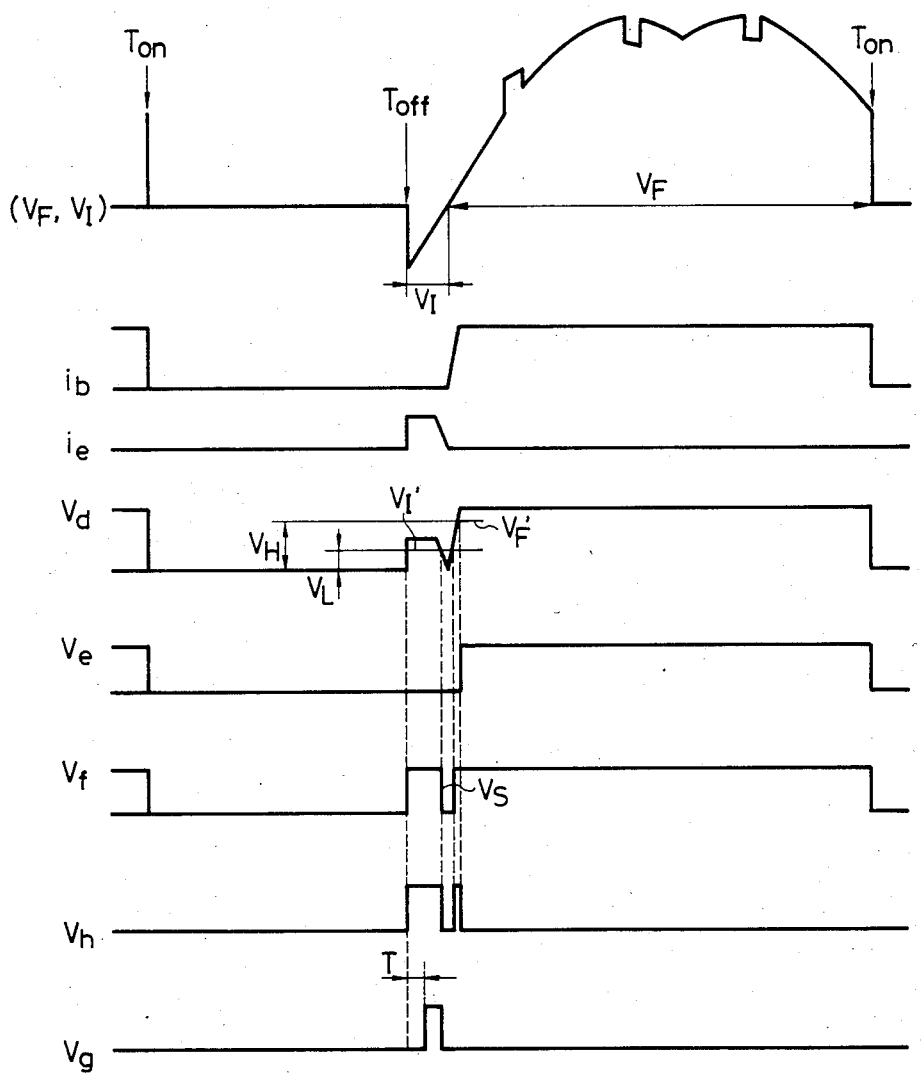
FIG. 2 is an operation waveform diagram at each portion of the circuit shown in FIG. 1.

The first comparison circuit 17 discriminates the backward voltage detection signal $V_I'$, and the second comparison circuit 18 discriminates the forward voltage detection signal $V_F'$. As shown in FIG. 2, a low level reference voltage source $V_L$ is connected to the first comparison circuit 17, and a high level reference circuit $V_H$, to the second comparison circuit 18. At the timing at which the signal $V_d$ contains the backward voltage detection signal $V_I'$, the signal $V_I'$ is discriminated by the first comparison circuit 17, is a waveform and is converted to a signal $V_f$. This signal has a logic level "1", and is applied to one of the input terminals of an AND circuit 21. The output signal of an inverter 20 is applied to the other input terminal of the AND circuit 21. At the timing of the backward voltage detection signal $V_I$, the output of the second comparison circuit 18 assumes a logic level "0", and hence the output signal of the inverter 20 assumes the logic level "1". As a result, the output signal $V_h$ of the AND circuit 21 is at the logic level "1".

A slit portion $V_s$ occurs in the signal $V_f$. Since the rise portion of the backward voltage $V_I$ of the thyristor 1 is oblique and is as such amplified to form the signal $V_d$, a recess is formed at the adjacent portion of the signal $V_d$ between the backward voltage detection signal $V_I'$ and the forward voltage detection signal $V_F'$. However, because the reference voltage source $V_L$ of the first comparison circuit 17 is set to the level shown in FIG. 2 ($V_d$), the first comparison circuit 17 effects the comparison operation for both of the backward voltage detection signal $V_I'$ and the forward voltage detection signal $V_F'$. That is, since the first comparison circuit 17 makes the comparison twice, the portion of the logic level "0", that is, the slit portion ($V_s$) described above, occurs on the comparison output $V_f$ between the first comparison and the second comparison.

The signal $V_f$ having this slit portion $V_s$ is subjected to the logic product operation with the output of the inverter 20 by the AND circuit 21, but since the output of the inverter 20 is at the logic level "0" at the point of time at which the output $V_d$ of the amplifier 15 reaches the level of the reference voltage level $V_H$ of the second comparison circuit 18, the output $V_h$ of the AND circuit 21 is also at the logic level "0", so that a waveform having a short pulse width such as shown in FIG. 2 ($V_h$) appears. This pulse should be removed because it causes the device to malfunction. In this embodiment, however, a timer 19 for preventing commutation failure is disposed at the post stage of the AND circuit 21. This timer 19 can detect the time width of the backward applied voltage $V_I$, and can confirm that the thyristor can sufficiently turn on within that time width. Therefore, the influence of the slit portion $V_s$ does not develop in the output $V_g$ of the timer 19 if the reference voltage levels $V_L$ and $V_H$ are selected so that the time width of the slit portion $V_s$ is below the delay time T of the timer 19.

As shown in FIG. 2 ($V_d$), the second comparison circuit 18 compares the reference voltage source $V_H$ with the signal $V_d$, and produces the signal $V_h$ of the logic level "1" when the signal $V_d$ exceeds the level of the reference voltage source $V_H$. This signal $V_h$ is as such used as the forward voltage detection signal.

Next, the operation of the detecting device will be described. During the period in which the applied voltage to the thyristor 1 is backward, the current $i_e$ flows from the cathode side of the thyristor 1 through the resistor 2, the diode 22, the high resistor 3, the constant voltage diode 5 which is parallel to the high resistor 3, the light emitting diode 4, the diode 25 and to the anode side of the thyristor 1. An optical signal corresponding to this current $i_e$ is transmitted to the photodiode 11 through the light guide 9, is then converted to an electric signal, and is thereafter amplified by the amplifier 15, thereby providing the amplification output $V_d$. The amplification output $V_d$ at this time is a low level, and is compared with the level of the reference voltage source $V_L$ by the first comparison circuit 17, thereby providing the comparison output $V_f$. Next, the backward voltage detection signal $V_g$ which is delayed by the timer 19 is obtained.

During the period in which the applied voltage of the thyristor 1 is forward, the current $i_b$ flows from the anode side of the thyristor 1 through the diode 24, the low resistor 6, the constant voltage diode 8 which is in parallel with the low resistor 6, the light emitting diode 4, the diode 23 and the cathode side of the thyristor 1. An optical signal corresponding to this current $i_b$ is transmitted from the light emitting diode 4 to the photo diode 11 through the light guide 9, and is converted to a voltage signal. This voltage signal is amplified by the amplifier 15 to provide the amplification output $V_d$. The amplification output $V_d$ at this time is relatively higher than during the application period of the backward voltage. While having the timing deviation corresponding to the time width of the short pulse of the signal $V_h$, the amplification output $V_d$ is input in parallel simultaneously to the two comparators 17 and 18 which have two different comparison levels. The output of the two comparators 17 and 18 can be obtained in accordance with the level of the amplification output Vd. The resulting slit portion $V_s$ is processed in the manner described already. The comparison circuit is as such produced as the forward voltage detection signal.

In the embodiment described above, the thyristor is shown used as a semiconductor power control rectification element, but GTO or power transistors can of course be used in the present invention.

As described above, the detecting circuit in accordance with the present invention converts the detection voltage when a forward voltage is applied to the thyristor convertor and the detection voltage when a backward voltage is applied thereto into optical signals while a relative potential difference is being provided to these voltages, and transmits these optical signals through a single optical transmission circuit, whereby the optical signals are converted again to the electric signals, and the discrimination circuit discriminates whether the electric signal is the forward detection voltage or the backward detection signal. Therefore, the present invention eliminates the necessity of doubling the circuit for taking out the forward and backward detection signals as required in the prior art, and since the circuit is single, the present invention can simplify circuit construction and can reduce the number of necessary components.

What is claimed is:

1. In an applied voltage detecting device for an electric power convertor which detects forward and backward voltages applied to a power convertor consisting of semiconductor power control rectification elements and converts and produces detection signals down to low level signals, the improvement comprising:

a detecting circuit for producing a detection voltage when a forward voltage is applied to said power convertor and a detection voltage when a backward voltage is applied thereto, while providing said detection signals with a relative potential difference;

a single optical transmission circuit for converting both of said detection voltages into optical signals and picking up said optical signals; and a discrimination circuit for discriminating whether said electric signals are the forward detection voltage or the backward detection voltage from the potential difference of said electric signals.

2. An applied voltage detecting device for an electric convertor as defined in claim 1 wherein said detecting circuit is equipped with a first current path through which a current from an electro-optical convertor of said optical transmission circuit flows when a forward voltage is applied to said power convertor and a second current path through which a current from said electro-optical convertor flows when a backward voltage is applied to said power convertor, and a voltage difference is provided between both of said detection voltages by inserting resistors having relatively different resistance values from each other into said first and second current paths, respectively.

3. An applied voltage detecting device for an electric power convertor as defined in claim 1 wherein said detecting circuit consists of full-wave rectification circuits having the input terminals thereof connected to the anode and cathode of said semiconductor power control rectification element, resistors having relatively different resistance values from each other and having one of the ends thereof connected to one of the output terminals of said bridge circuits, and a light emitting diode connected between the other common output terminal of said bridge circuit and the other end each of said resistors.

4. An applied voltage detecting circuit for an electric power convertor as defined in claim 3 wherein said full-wave rectification bridge circuit consists of first and second branches each having a plurality of diodes, the common junction of each of said diodes of each of said branches is connected to the anode and cathode of said semiconductor power control rectification element, and constant voltage diodes for protecting the overvoltage of said light emitting diode are connected between the output terminals of said branches.

5. An applied voltage detecting device for an electric power convertor as defined in claim 1 wherein said discrimination circuit consists of a first comparison circuit operated by a high potential reference voltage and a second comparison circuit operated by a low potential reference voltage.

6. An applied voltage detecting circuit for an electric power convertor as defined in claim 2 wherein said discrimination circuit consists of a first comparison circuit operated by a high potential reference voltage and a second comparison circuit operated by a low potential reference voltage.

7. An applied voltage detecting device for an electric power convertor as defined in claim 5 which further includes an inverter connected to said second comparison circuit, an AND circuit connected between said first comparison circuit and said inverter, and a timer connected to said AND circuit.

8. An applied voltage detecting device for an electric power convertor as defined in claim 6 which further includes an invertor connected to said second comparison circuit, an AND circuit connected between said first comparison circuit and said inverter, and a timer connected to said AND circuit.

* * * * *